United States Patent [19]

Lese et al.

[11] 4,224,482

[45] Sep. 23, 1980

[54] MOBILE MICROPHONE-TRANSMITTER ASSEMBLY

[75] Inventors: Gregory Lese, Long Branch; Charles F. Liebler, Piscataway; Dilipkumar B. Patel, Ocean, all of N.J.

[73] Assignee: Bell Telephone Laboratories, Incorporated, Murray Hill, N.J.

[21] Appl. No.: 965,076

[22] Filed: Nov. 30, 1978

[51] Int. Cl.² .................................... H04M 1/05
[52] U.S. Cl. ............................................ 179/157
[58] Field of Search ................... 250/199; 179/157

[56] References Cited

U.S. PATENT DOCUMENTS

| | | | |
|---|---|---|---|
| 3,124,657 | 3/1964 | Peterson | 179/81 |
| 3,134,074 | 5/1964 | Litke | 325/118 |
| 3,564,416 | 2/1971 | Price | 325/111 |
| 4,068,093 | 1/1978 | Fidi | 179/1GP |
| 4,134,007 | 1/1979 | Koreicho et al. | 250/199 |

FOREIGN PATENT DOCUMENTS

| | | | |
|---|---|---|---|
| 205321 | 12/1908 | Fed. Rep. of Germany | 179/157 |
| 2358626 | 7/1975 | Fed. Rep. of Germany | 250/199 |
| 2431937 | 1/1976 | Fed. Rep. of Germany | 250/199 |
| 2604652 | 8/1977 | Fed. Rep. of Germany | 250/199 |

OTHER PUBLICATIONS

*Electronic Design* 18, Sep. 1, 1976, "Speech/Hearing Aid Uses Infrared Light Transmitter".

*Primary Examiner*—Thomas W. Brown
*Attorney, Agent, or Firm*—Joseph P. Kearns; Hugh L. Logan

[57] ABSTRACT

A mobile microphone-transmitter assembly is disclosed which comprises a microphone, a plurality of infrared light emitting devices, electrical apparatus connected between the microphone and the devices to energize the devices in response to inputs to the microphone and a mechanical structure for supporting the devices to produce a substantially omnidirectional, horizontal radiation pattern when the structure is worn by a user and the devices are energized.

2 Claims, 3 Drawing Figures

MOBILE MICROPHONE-TRANSMITTER ASSEMBLY

CROSS-REFERENCE TO RELATED APPLICATION

Filed concurrently with and related to the present application is design application Ser. No. 965,068 by R. W. Austin, D. M. Genaro, C. F. Liebler, D. B. Patel, and G. E. Sylvester.

BACKGROUND OF THE INVENTION

1. Field of the Invention

This invention relates to mobile, microphone-transmitter assemblies.

2. Description of the Prior Art

Various mobile, microphone-transmitter assemblies are found in the prior art. Some are referred to as cordless, self-contained microphone transmitters (see U.S. Pat. No. 3,564,416), microphone transmitter having a lavalier type antenna (see U.S. Pat. No. 3,134,074) and wireless loudspeaking telephones (see U.S. Pat. No. 3,124,657). Each of these and similar arrangements transmit radio frequency signals which are received by base stations. There are, however, several disadvantages to transmitting radio frequency signals. Firstly, they require some sort of antenna structure. Secondly, they may interfere with one another or other electronic apparatus located in adjacent rooms or offices.

Another form of wireless communications which overcomes the above disadvantages uses infrared energy. Stereo sound systems having infrared transmitters at their base stations and infrared receivers in headphones have been built, for example, so that a user may move relatively freely about a room and still appreciate the stereo effect (see U.S. Pat. No. 4,068,093). Furthermore, television receivers having infrared transmitters at their picture tube locations and infrared receivers in headphones have been built so that television sound may be heard by a viewer without the sound disturbing the other household members.

SUMMARY OF THE INVENTION

An object of the present invention is to provide a hands-free, mobile and self-contained assembly for transmitting speech and/or other intelligence via infrared radiation to a base station.

This and other objects are achieved in accordance with the present invention through the use of a microphone, a plurality of infrared light emitting devices, electrical apparatus connected between the microphone and the devices to energize the devices in response to inputs to the microphone and a mechanical structure for supporting the devices to produce a substantially omnidirectional, horizontal radiation pattern when the structure is worn by a user and the devices are energized.

In a preferred embodiment, the mechanical structure is configured to be worn around the user's neck with the structure surrounding at least the back and one side of the user's neck. In this embodiment, the microphone, the electrical apparatus interconnecting the microphone and the devices, and at least one of the devices are located in a pod-like portion of the mechanical structure which portion resides, when being worn, just below the user's neck and resting against the user's body. The remaining devices are disposed in the portion of the mechanical structure which surrounds a portion of the user's neck so that the devices, when energized, emit infrared energy in a substantially omnidirectional, horizontal pattern about the user. As a result of the manner in which the embodiment can be worn and the pattern of energy emitted when so worn, infrared energy may be received by a base telephone set while the user is freely moving about the room.

DETAILED DESCRIPTION

Figure 1:
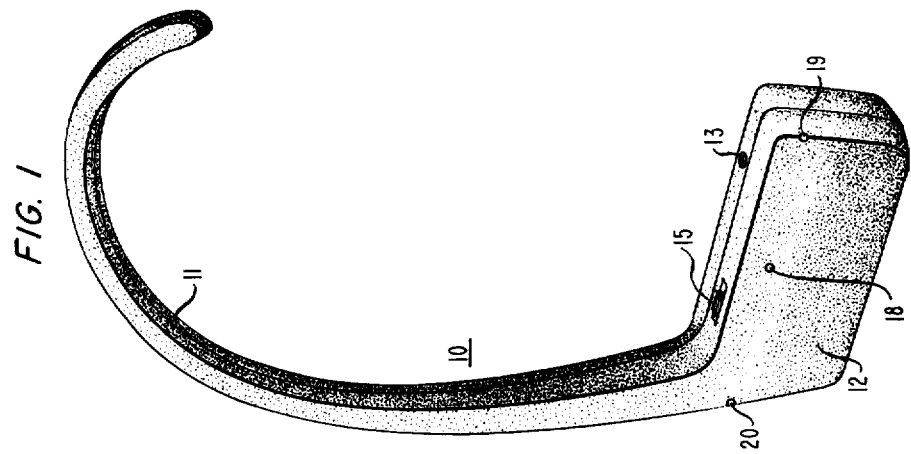
FIGS. 1 and 2 show front and rear perspective views of an embodiment of the invention.
Figure 2:
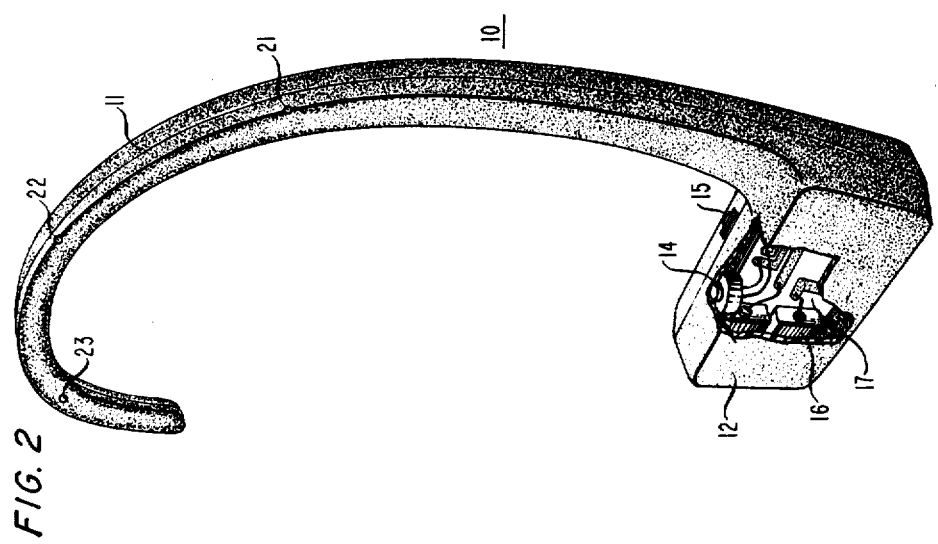

FIG. 1 shows a front perspective view of one embodiment of the invention while FIG. 2 shows a rear perspective view of that embodiment. The embodiment comprises a plastic structure generally identified as 10 and having a hook-like portion 11 and a pod-like portion 12. When being worn by the user, hook-like portion 11 fits partially around the user's neck so that structure 10 hangs thereon and pod-like portion 12 rests against the user's body below the neck as shown in FIG. 3.

Pod-like portion 12 has a microphone port 13 in one of the upper surfaces thereof so that the user's voice may be received by a microphone 14 mounted within portion 12 as shown in the cut-away section of FIG. 2. In addition, an on-off switch 15 is mounted on a second upper surface. This switch operates to connect a battery 16 to a printed circuit board 17, both of which are mounted in pod-like portion 12.

Figure 3:
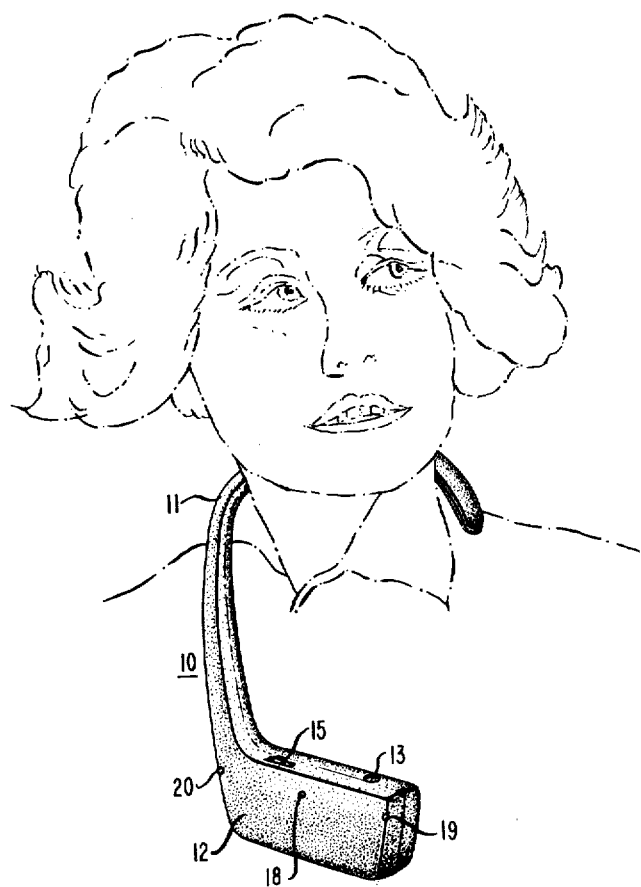
FIG. 3 shows the embodiment being worn by a user.

As shown in FIGS. 1 and 3, the front surface of portion 12 includes an LED device 18 while a pair of LED devices 19 and 20 are mounted in its two substantially vertical edges, respectively. When worn by a user and energized, device 18 radiates infrared light having its maximum intensity directed substantially in a horizontal plane and perpendicular to the front surface of pod 12. Under these same conditions, devices 19 and 20 radiate, when energized, infrared light having its maximum intensity directed substantially horizontally and at about 60 degree horizontal angles with respect to the maximum intensity of device 18.

Finally, as shown in FIG. 2, three LED devices 21, 22 and 23 are mounted in hook-like portion 11. These three devices are spaced on portion 11 and directed so that when structure 10 is worn and the devices are energized, the maximum intensity of the light for device 22 is directed substantially horizontally and to the rear of the user while the maximum intensities of devices 21 and 23 are directed substantially horizontally and at about 60 degree horizontal angles to either side of the maximum intensity of the light from device 22.

Printed circuit board 17 is connected between microphone 14 and all of the LED devices 18 through 23. Board 17 may include, for example, an audio amplifier to provide gain and frequency preemphasis to the output of microphone 14. The board may also include a voltage controlled oscillator which has a nominal frequency of 95 kHz and which is modulated by the amplifier output so as to produce a frequency modulated signal. Finally, the board may include a driver stage to provide current pulses to all of devices 18 through 23 in response to the oscillator output.

When the above-described embodiment of the invention is worn and receives a speech input, frequency modulated infrared energy is radiated in a substantially horizontal, omnidirectional pattern. With this embodiment, a user may freely move about a room and use his or her hands for other purposes while transmitting speech via infrared radiation to a base station. The number of devices utilized may of course be changed; however, a number to assure omnidirectional coverage should be used.

There are numerous applications for such a portable, hands-free operation. Embodiments of the invention may be used with conventional speakerphones where the phones are equipped with infrared receivers. Such a receiver receives and demodulates the infrared signals and applies the recovered audio signals to the transmitting port of the telephone in place of the output of the conventional telephone microphone. Through the use of embodiments of the invention in this manner, the echo or "rain-barrel" effect prevalent with speakerphones is eliminated.

Another application of embodiments of the invention would be by a speaker addressing a group of people. Such a user could freely move about and use his or her hands for sketching, pointing and the like while the speaker's voice is picked up by a base station and reproduced over a public address system.

We claim:

1. A mobile microphone-transmitter assembly comprising
    mechanical means with a hook-like portion to be worn around the neck of a user and a pod-like portion which rests against the front of the body of a user,
    a first plurality of light emitting devices located on said hook-like portion so as to radiate generally to the rear of said user,
    a second plurality of light emitting devices located on said pod-like portion so as to radiate generally to the front of said user,
    a microphone mounted on said pod-like portion, means within said pod-like portion for energizing said first and second pluralities of light emitting devices, and
    means responsive to sound energy incident on said microphone for controlling the light intensity of both pluralities of said light emitting devices accordingly,
    said first and second plurality of light emitting devices providing a substantially omnidirectional, horizontal infrared radiation pattern.

2. The assembly in accordance with claim 1 in which said hook-like and pod-like portions are combined in a unitary structure.

* * * * *